(12) United States Patent
Albessard et al.

(10) Patent No.: US 10,401,545 B2
(45) Date of Patent: Sep. 3, 2019

(54) OPTICAL GUIDE SHAPED BY LASER

(71) Applicant: VALEO VISION, Bobigny (FR)

(72) Inventors: Jean-Marc Albessard, Bobigny (FR); Nirina Rasoldier, Bobigny (FR); Jerome Le Corre, Bobigny (FR); Laurent Liard, Bobigny (FR); Bruno Ducloux, Bobigny (FR); Alexandre Lefebvre, Bobigny (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 16/023,893

(22) Filed: Jun. 29, 2018

(65) Prior Publication Data

US 2019/0004229 A1 Jan. 3, 2019

(30) Foreign Application Priority Data

Jun. 30, 2017 (FR) ...................... 17 56231

(51) Int. Cl.
*F21V 8/00* (2006.01)
*B23K 26/00* (2014.01)
(Continued)

(52) U.S. Cl.
CPC .......... *G02B 6/001* (2013.01); *B23K 26/0006* (2013.01); *B23K 26/354* (2015.10); *B23K 26/355* (2018.08); *B23K 26/359* (2015.10); *B23K 26/364* (2015.10); *B23K 26/402* (2013.01); *B29D 11/00663* (2013.01); *G02B 6/0006* (2013.01); *G02B 6/0043* (2013.01); *G02B 6/0065* (2013.01);
(Continued)

(58) Field of Classification Search
CPC .... G02B 6/001; G02B 6/0006; B23K 26/354; B23K 26/359; B23K 26/0006; B29D 11/00663; B29K 2033/12
See application file for complete search history.

(56) References Cited

U.S. PATENT DOCUMENTS

2004/0052089 A1* 3/2004 Coto .................... G02B 6/0006
362/551
2008/0239721 A1* 10/2008 Mezouari ............... G01D 11/28
362/253

(Continued)

FOREIGN PATENT DOCUMENTS

DE 35 28 177 A1 2/1987
JP 2013-143301 7/2013
(Continued)

OTHER PUBLICATIONS

French preliminary Search Report dated Feb. 19, 2018 in French Application 17 56231, filed on Jun. 30, 2017 (with English Translation of Categories of cited documents)

*Primary Examiner* — Mary Ellen Bowman
(74) *Attorney, Agent, or Firm* — Oblon, McClelland, Maier & Neustadt, L.L.P.

(57) ABSTRACT

A method of manufacturing a light optical guide, including the following steps: providing the optical guide extending in a main direction, the guide having an outer surface; producing along the outer surface of the optical guide, in the main direction, diffusing or reflecting patterns which can make the light exit the guide; and wherein the diffusing or reflecting patterns are produced by using a laser ray on the outer surface of the optical guide.

20 Claims, 2 Drawing Sheets

(51) Int. Cl.
*B29D 11/00* (2006.01)
*B29K 33/00* (2006.01)
*B23K 101/20* (2006.01)
*B23K 103/00* (2006.01)
*B23K 26/352* (2014.01)
*B23K 26/354* (2014.01)
*B23K 26/359* (2014.01)
*B23K 26/364* (2014.01)
*B23K 26/402* (2014.01)

(52) U.S. Cl.
CPC ........ *G02B 6/0091* (2013.01); *B23K 2101/20* (2018.08); *B23K 2103/42* (2018.08); *B29K 2033/12* (2013.01)

(56) References Cited

U.S. PATENT DOCUMENTS

| | | | |
|---|---|---|---|
| 2010/0208496 A1* | 8/2010 | Kim | B29D 11/00663 362/613 |
| 2010/0213632 A1* | 8/2010 | Katsumoto | B29C 47/0066 264/167 |
| 2012/0008341 A1* | 1/2012 | Park | G02B 5/0221 362/622 |
| 2015/0138836 A1* | 5/2015 | Momose | G02F 1/133615 362/613 |
| 2015/0260898 A1 | 9/2015 | Gourlay | |
| 2017/0205562 A1* | 7/2017 | Koizumi | G02B 5/02 |

FOREIGN PATENT DOCUMENTS

| | | |
|---|---|---|
| KP | 10-2012-0062513 | 6/2012 |
| WO | WO 2010/021896 A1 | 2/2010 |

\* cited by examiner

OPTICAL GUIDE SHAPED BY LASER

The invention relates to the field of lighting and of light signalling, particularly for a motor vehicle. More specifically, the invention relates to the field of lighting and of light signalling by means of light optical guides.

In the field of lighting and light signalling for motor vehicles, it is becoming increasingly frequent to use optical guides. Indeed, these have the advantage of being able to take extremely varied geometric shapes and to bring an lighting surface into relatively inaccessible areas of a lighting and/or signalling device. This is specifically interesting in the current context in which car manufacturers seek to give the vehicles thereof a signature which is specific thereto, particularly by proposing complex shapes for the lighting and/or signalling devices.

Optical guide in the present application means a transparent or translucent piece, in the range of the visible wavelengths, inside which light rays spread in a controlled manner from at least one of the ends of the guide, called the inlet face, as far as at least one outlet face. The light is spread in a controlled manner generally by successive total reflections on various reflection faces internal to the optical guide.

The published patent document EP 1 434 000 A2 discloses an optical guide in plate form and provided, on one of the main faces thereof, with diffusing or reflecting hollow patterns, distributed over the face in question and intended to allow the light spreading in the guide to exit said guide. In the case of diffusing patterns, the latter have a surface ground state whereas in the case of reflecting patterns, the surface state thereof is polished. These patterns are produced directly during the moulding of the optical guide by supplying the mould with corresponding embossings.

The published patent document US 2010/0157619 A1 also discloses an optical guide, however with a generally circular section, and with an elongated shape in a main direction. The guide also comprises reflecting or diffusing patterns distributed over a face of the guide along the main direction. These patterns are also produced during the moulding of the guide and possibly by additional application of a paint or of a reflecting or diffusing coating.

The published patent document DE 10 2013 007 938 A1 also discloses an optical guide in flexible plate form and also provided with patterns produced by overmoulded dots of paint.

In the three teachings mentioned above, the optical guides are produced by moulding. Yet for some uses, the optical guides have a long length, particularly greater than or equal to 1000 mm. It is then preferable, from a manufacturing cost perspective, to produce these guides by extrusion, particularly when the guide cross-section is generally circular or oval. Such a manufacturing method, which is known per se by a person skilled in the art, does not make it possible to produce the reflecting or diffusing patterns. Moreover, producing patterns by moulding is restrictive in that the configuration thereof, i.e. the size, shape and positioning thereof, is fixed by the mould.

The aim of the invention is to overcome at least one of the disadvantages of the aforementioned prior art. More specifically, the aim of the invention is to allow the production of reflecting or diffusing patterns on an optical guide, in an economical and flexible manner.

The subject matter of the invention is a method of manufacturing a light optical guide, comprising the following steps: providing the optical guide extending in a main direction, said guide having an outer surface; producing along the outer surface of the optical guide, in the main direction, diffusing or reflecting patterns which can make the light exit said guide; characterized in that the diffusing or reflecting patterns are produced by using a laser ray on the outer surface of the optical guide.

According to an advantageous mode of the invention, in the step of providing the optical guide, said guide has a constant section.

According to an advantageous mode of the invention, in the step of providing the optical guide, said guide is produced by extrusion.

According to an advantageous mode of the invention, the method comprises a prior step of producing the optical guide by extrusion.

According to an advantageous mode of the invention, the optical guide is made of a transparent or translucent thermoplastic material, in the range of the visible wavelengths, preferably made from poly(methyl methacrylate) (PMMA).

According to an advantageous mode of the invention, in the step of producing diffusing or reflecting patterns, the laser ray is emitted by a $CO_2$ laser emitting in the infrared range between 9.4 µm and 10.6 µm.

According to an advantageous mode of the embodiment, in the step of producing the diffusing or reflecting patterns, the configuration of said patterns changes along the main direction of the guide. Changing configuration means that the size, the spacing and/or the shape of the patterns have variations along the main direction of the optical guide. Such a variation can particularly be configured in order to compensate for the progressive losses of light along the guide.

According to an advantageous mode of the invention, the method further comprises the following step: polishing at least one end face of the optical guide by using a laser ray on said face. This step can take place before, during or after the step of producing the diffusing or reflecting patterns.

Polishing the at least one end face of the optical guide can also take place by mechanical polishing and/or hot-plating of said face.

According to an advantageous mode of the invention, in the step of providing the optical guide, said guide has at least one longitudinal rib, and the method further comprises the following step: producing at least one notch in the or one of the ribs by removing matter by means of a laser ray.

According to an advantageous mode of the invention, the notch(s) is(are) located less than 50 mm from an end face of the optical guide.

Another subject matter of the invention is a light optical guide made from transparent or translucent material, in the range of the visible wavelengths, extending in a main direction; characterized in that the guide further comprises at least one longitudinal rib, said rib or at least one of said ribs forming at least one notch less than 50 mm from an end face of said guide.

The notch(s) is(are) advantageously produced by removing matter from the rib(s), specifically by means of a laser beam.

According to an advantageous mode of the invention, the guide has a portion extending from the end face up to a distance from the notch(s), said portion not having a rib.

According to an advantageous mode of the invention, the guide has a generally circular or oval constant cross-section.

According to an advantageous mode of the invention, there are at least two, preferably two and diametrically opposite, longitudinal ribs.

According to an advantageous mode of the invention, there are at least two notches at different positions in the main direction. The positional difference provides a poka yoke and focal position setting function.

Another subject matter of the invention is a light module comprising an area for receiving a light optical guide with a view to an optical coupling with said guide; characterized in that the area for receiving the optical guide forms a bushing that can receive an end of the optical guide according to the invention and with means for engaging the notch(es) of said guide.

According to an advantageous mode of the invention, the engaging means of the bushing comprise at least one groove or rib, formed inside said bushing and configured to engage the notch(es) during a rotation or clipping of said guide.

According to an advantageous mode of the invention, the engaging means of the bushing comprise at least one slat that can elastically deform when the optical guide is inserted into said bushing and then engage the notch(es) of said guide.

According to an advantageous mode of the invention, the module comprises the optical guide.

The measures of the invention are interesting in that they allow optical guides to be produced in an economical and flexible manner, mainly in that producing diffusing or reflecting patterns can be easily adjusted from one guide to another by modifying the data for the route and/or for the intensity of the laser beam producing said patterns. This production technique is specifically interesting for long-length optical guides, more specifically when they are manufactured by extrusion. The presence of one or more longitudinal ribs on the optical guide is specifically interesting when the optical guide is manufactured by extrusion. Moreover, these ribs can be easily cut by using a laser beam in order to form retaining notches for the optical guide in a light module bushing.

Other features and advantages of the present invention will be better understood upon reading the description and the drawings wherein.

Figure 4:
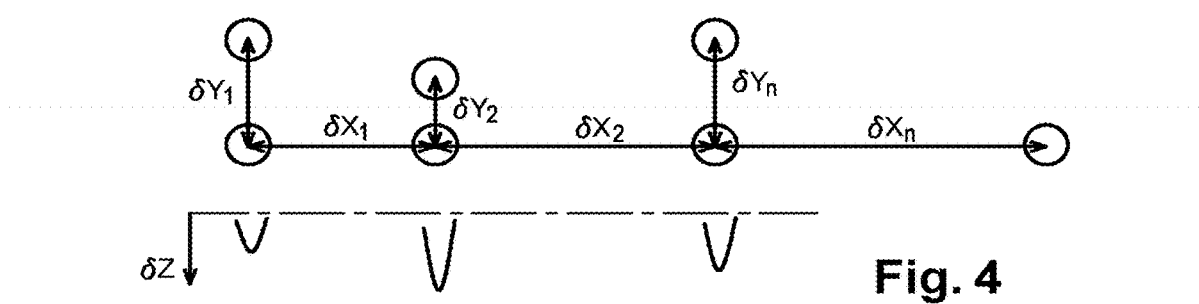
Figure 5:
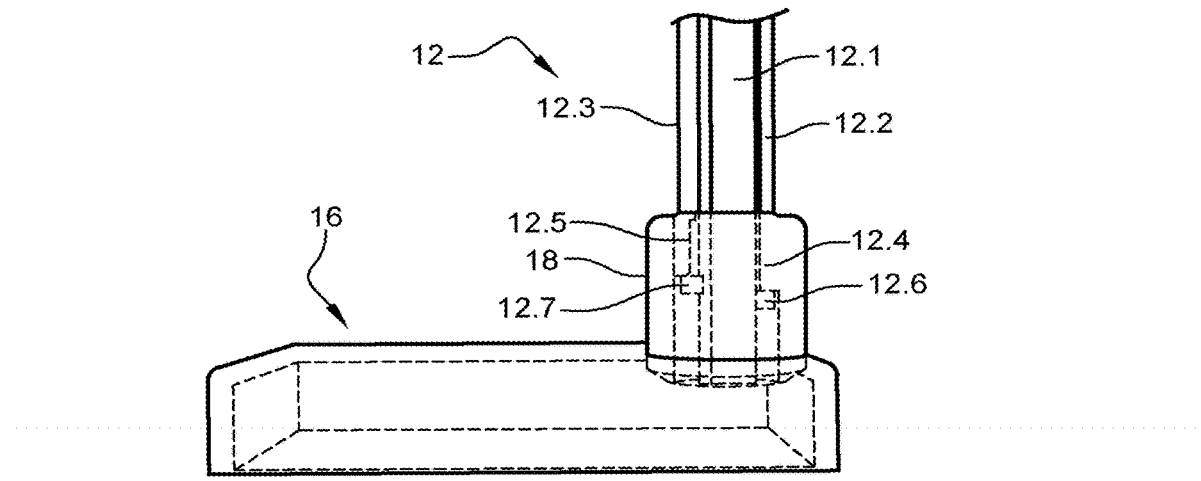
Figure 6:
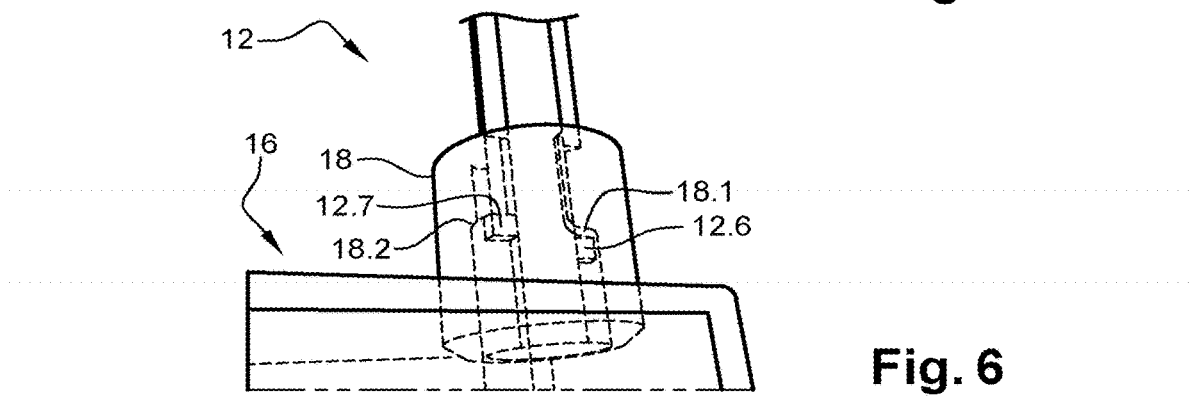
Figure 7:
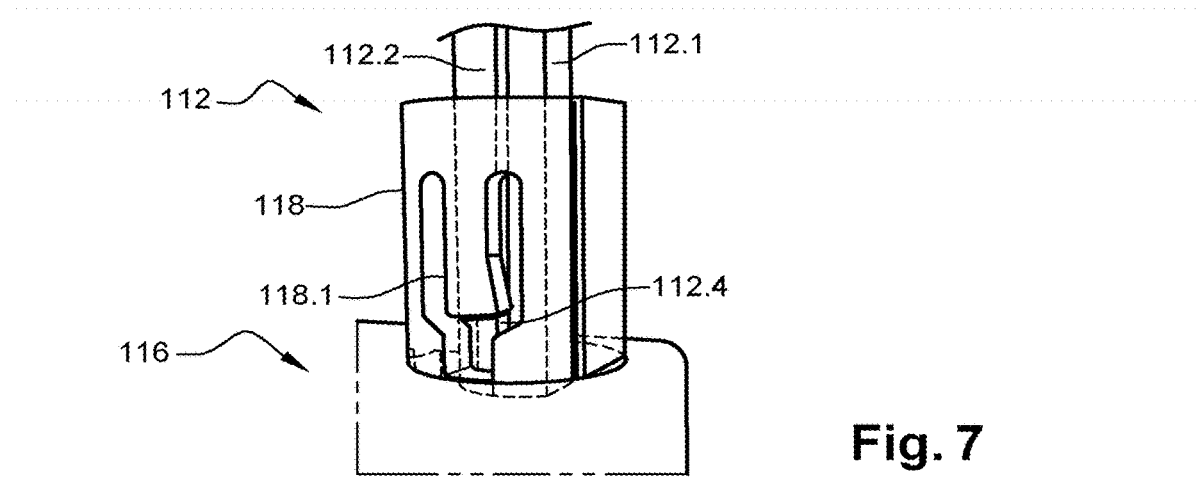

FIG. 4 schematically illustrates the formation of the diffusing or reflecting patterns via the positioning of the laser ray and via the depth of hollows formed by the laser ray;

FIG. 5 illustrates a coupling between an optical guide and a light module, in accordance with a first embodiment of the invention;

FIG. 6 is a detailed view and according to another perspective of the coupling of FIG. 5;

FIG. 7 illustrates a coupling between an optical guide and a light module, in accordance with a second embodiment of the invention.

Figure 1:
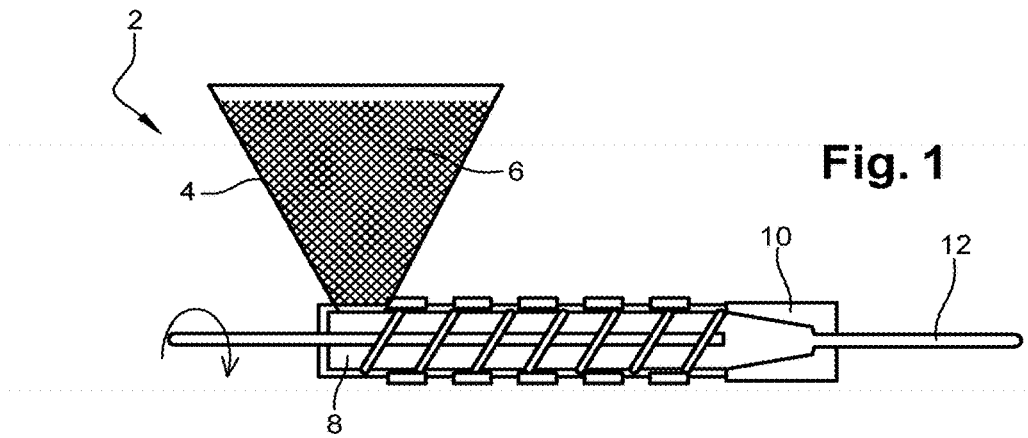
FIG. 1 is a schematic illustration of producing an optical guide by extrusion.

FIG. 1 schematically illustrates a device and a method of manufacturing an optical guide by extrusion. Such a device and method is known per se for manufacturing various long products, such as bars or sections made of plastic.

The extrusion device 2 essentially comprises a feed hopper 4 receiving the solid plastic 6 in the form of pellets. The hopper 4 feeds a screw device 8 provided with heating means and with an extrusion sleeve 10. The plastic, thermoplastic in the present case, is made pasty by the temperature increase caused by the heating means and is pushed toward the sleeve by rotating the screw, in order to exit therefrom in an essentially plastic state, i.e. hard at the surface and soft inside, and to form the optical guide 12. The optical guide 12 then has a cross-section with a constant shape and a generally smooth outer surface.

The optical guide 12 can have a length greater than or equal to 500 mm, preferably greater than or equal to 1000 mm. The cross-section can have any shape, preferably generally circular or oval, with an average diameter that can be greater than or equal to 3 mm and/or less than or equal to 5 mm.

Figure 2:
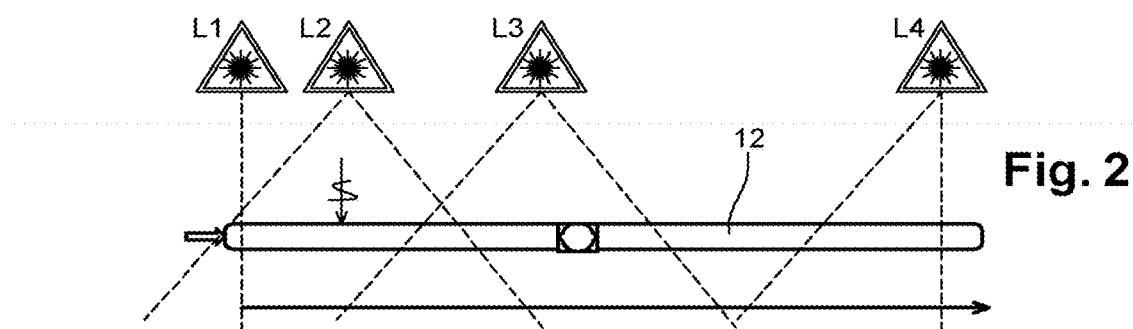
FIG. 2 is a schematic illustration of producing diffusing or reflecting patterns on the outer surface of an optical guide by laser ray use, in accordance with the invention.

FIG. 2 illustrates the production of diffusing or reflecting patterns on the outer surface of the optical guide 12 that is advantageously produced by an extrusion method as described in relation to FIG. 1. One or more laser sources $L_1$, $L_2$, $L_3$, ... $L_n$ can be used. These are $CO_2$ laser sources which emit in the infrared range, between 9.4 μm and 10.6 μm. Such lasers are well known per se to a person skilled in the art. The effect of the laser beam which impacts upon the outer surface of the optical guide 12 is to increase the temperature to the point of reaching and exceeding the melting temperature of the thermoplastic material. The latter will then deform in order to form a cavity and therefore a surface portion geometrically different to the adjacent outer surface. This surface portion will then form a refracting surface that is functionally different to the refracting surface formed by the adjacent outer surface. If it is smooth, this surface portion will be able to reflect, in a different manner, the incident rays spreading in the guide, according to an orientation that allows them to then be refracted and exit the optical guide. If it is rough, it will refract the rays in multiple directions and thus diffuse the rays outside the optical guide.

The lasers can be commanded in order to move the produced beam. A variation of the speed of movement of the beam over the outer surface of the optical guide 12 makes it possible to vary the intensity of the heating of the matter and thus the depth of the pattern. Movement of the beam, or stopping thereof, will produce a deeper pattern than a beam that moves more rapidly, for a beam given power. The speed of movement of the beam also has an impact on the finish of the modified surface, wherein the latter can be smooth or rough. The power of the lasers can also be commanded. The combination of commanding the movement and power of the laser beam makes it possible to produce reflecting patterns and other diffusing patterns.

For information purposes only, the rated power of a laser of approximately 80 W can be modulated between 60% and 120%, or a rated power of approximately 150 W to 200 W can be modulated between 40% and 60%.

Figure 3:
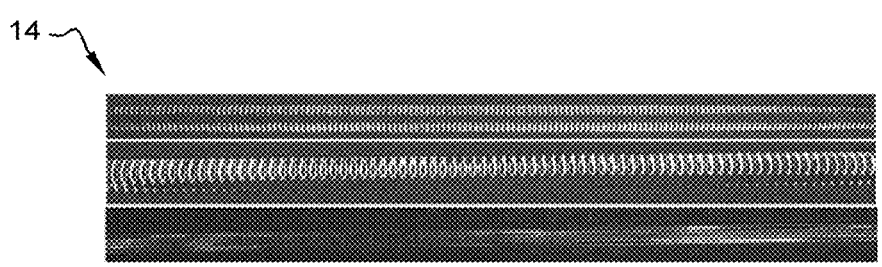
FIG. 3 illustrates various configurations of diffusing or reflecting patterns on the outer surface of an optical guide, in accordance with the invention.

FIG. 3 illustrates various types of patterns 14 that can be envisaged. The upper strip shows two rows of relatively short transverse patterns. The intermediate strip shows patterns forming transverse lines and patterns in the shape of dots. The lower strip shows several rows, in this case 5, of patterns of smaller size. It is, however, understood that other configurations can indeed be envisaged.

An operation for smoothing one or the two ends of the optical guide can be carried out by means of a laser such as one of the lasers $L_1$, $L_2$, $L_3$, ... $L_n$ of FIG. 2.

FIG. 4 illustrates, in a somewhat schematic manner, the directions of movement along the axes x and y of the beam of the laser over the outer surface of the optical guide. The axis x corresponds to the longitudinal direction and the axis y corresponds to the transverse direction. The axis z corresponds to the depth of the pattern formed in the outer surface of the optical guide. The circular marks correspond to the impact of the laser beam on the optical guide. It can be seen that the laser beam can be moved transversally by a distance $\delta y_1$. During this movement, the laser beam can remain active or, alternatively, be interrupted. In the first case, the pattern will extend transversally and in the second case, two mainly dot-form patterns will be formed. The depth of the pattern(s) will be greater or lesser depending on the power of the laser beam and on the speed of movement thereof or on the stopping time thereof. The beam can then be moved longitudinally by a distance $\delta x_1$ and then transversally by a distance $\delta y_2$. Similarly, the depth of the pattern(s) will be greater or lesser depending on the power of the laser beam and on the speed of movement thereof or on the stopping time thereof. It can be seen that the depth of the pattern produced by the movement $\delta y_2$ is greater.

FIGS. 5 to 7 illustrate two embodiments of coupling between an optical guide advantageously produced according to the method described above and a light module. FIGS. 5 and 6 illustrate a first embodiment and FIG. 7 illustrates a second embodiment.

In FIGS. 5 and 6, it can be seen that the optical guide 12 has a generally circular central part 12.1 and two ribs 12.2 and 12.3 extending longitudinally and in a radially opposite manner along the central part 12.1. The section of the optical guide 12 is furthermore shown in FIG. 2, at a central part of the optical guide 12.

An end of the optical guide 12 is engaged in a light module 16. More specifically, the latter comprises a bushing 18 receiving said end. It is also seen, via transparency through the bushing, that the ribs 12.2 and 12.3 each have a notch 12.4 and 12.5, respectively. More specifically again, these notches 12.4 and 12.5 form the lugs 12.6 and 12.7, these lugs then being able to cooperate by engagement with corresponding grooves or ribs formed inside the bushing 18. The lugs 12.6 and 12.7 are advantageously at a distance from the proximal end of the optical guide such that the end portion of said guide extending from the end in question up to the lugs does not have a rib. In the case of a guide with a circular central portion 12.1, this end portion can then be received by a circular bore and therefore plug in and satisfactorily hold the optical guide 12 in the bushing 18. After having been plugged in, the optical guide 12 can then be turned by a fraction of a turn in order to engage the lugs 12.6 and 12.7 with the corresponding grooves of the bushing. The end portion can then freely rotate while satisfactorily holding the optical guide in the bushing.

In FIG. 6 showing the bushing 18 and the optical guide 12 according to a somewhat different perspective, it is possible to see the two grooves 18.1 and 18.2, which are generally horizontal, with which the lugs 12.6 and 12.7 cooperate when the optical guide rotates in the bushing.

FIG. 7 illustrates the second embodiment for coupling between an optical guide and a light module. The reference numbers of FIGS. 5 and 6 are used to designate the identical or corresponding elements, however with these numbers being increased by 100.

In a similar manner to the embodiment of FIGS. 5 and 6, the optical guide 112 comprises a central portion 112.1 and two longitudinal and radially opposites ribs. In FIG. 7, only one of the ribs, in the present case the rib 112.2, is visible. It is also understood that the presence of a single rib can also be envisaged. Each of the ribs has a notch 112.4 suitable for engaging with a slat 118.1 of the bushing 118. The or each of the slats is elastically deformable when inserting the optical guide 112 into the bushing, in order to then return to the original form thereof when the contact area of said slat with the groove faces the notch 112.4. In this configuration, the rib(s) can extend as far as the proximal end of the optical guide, mainly since no rotation takes place between the optical guide and the bushing.

In the two embodiments above and in a general manner, the notch(s) in the rib(s) can be produced by using a laser ray. The laser ray then cuts the rib(s) in order to form the notches. As a result, the notches can be very easily produced by removing matter, in the present case by using a laser ray. Removing matter could however also be achieved by other techniques, such as by machining in particular.

The invention claimed is:

1. A method of manufacturing a light optical guide, comprising:
   producing along a main direction of an outer surface of the light optical guide, the light optical guide extending in the main direction, reflecting patterns which make the light exit the light optical guide, wherein
   the reflecting patterns are produced by using a laser ray on the outer surface of the light optical guide.

2. The method according to claim 1, wherein, the light optical guide has a constant cross-section.

3. The method according to claim 1, wherein, the light optical guide is produced by extrusion.

4. The method according to claim 1, wherein the method comprises producing the light optical guide by extrusion prior to producing the reflecting patterns.

5. The method according to o claim 1, wherein the light optical guide is made of transparent or translucent thermoplastic material, in the range of the transparent wavelengths, made from poly (methyl methacrylate) (PMMA).

6. The method according to claim 1, wherein, in the producing reflecting patterns, the laser ray is emitted by a $CO_2$ laser emitting in the infrared range between 9.4 μm and 10.6 μm.

7. The method according to claim 1, wherein, in the producing the reflecting patterns, the configuration of the patterns changes along the main direction of the guide.

8. The method according to claim 1, wherein the method further comprises:
   polishing at least one end face of the light optical guide by using a laser ray on the face.

9. The method according to claim 1, wherein the method further comprises:
   polishing at least one end face of the light optical guide by mechanical polishing and/or hot-plating of the face.

10. The method according to claim 1, wherein, the light optical guide has at least one longitudinal rib, and the method further comprises:
    producing at least one notch in the at least one longitudinal rib by removing matter via illumination of a laser ray.

11. The method according to claim 10, wherein the at least one notch is located less than 50 mm from an end face of the light optical guide.

12. A light optical guide made from transparent or translucent material, in the range of the visible wavelengths, extending in a main direction, the light optical guide comprising:
    reflecting patterns along an outer surface of the light optical guide in the main direction; and
    at least one longitudinal rib, the at least one longitudinal rib forming at least one notch less than 50 mm from an end face of the light optical guide.

13. The light optical guide according to claim 12, wherein the light optical guide has a portion extending from the end face up to a distance from the at least one notch, the portion not having a rib.

14. The light optical guide according to claim 12, wherein the light optical guide has a generally circular or oval constant cross-section.

15. The light optical guide according to claim 12, wherein there are two, diametrically opposite, longitudinal ribs.

16. The light optical guide according to claim 12, wherein there are at least two notches at different positions in the main direction.

17. A light optical module comprising:
- an area for receiving a light optical guide, wherein
  - the light optical guide is made from transparent or translucent material, in the range of the visible wavelengths, extending in a main direction, it comprises reflecting patterns along an outer surface thereof in the main direction and at least one longitudinal rib, the at least one longitudinal rib forming at least one notch less than 50 mm from an end face of the light optical guide, and
  - the area for receiving the light optical guide forms a bushing that receives an end of the light optical guide and engages the at least one notch of the light optical guide.

18. The light module according to claim 17, wherein the bushing comprises at least one groove formed inside the bushing and is configured to engage the at least one notch during a rotation of the guide.

19. The light module according to claim 17, wherein the the bushing comprises at least one slat that elastically deforms when the light optical guide is inserted into the bushing and then engages the at least one notch of the light optical guide.

20. The light module according to claim 17, wherein the light module comprises the light optical guide.

* * * * *